United States Patent [19]

Wrightman

[11] Patent Number: 4,938,263
[45] Date of Patent: Jul. 3, 1990

[54] MACHINE FOR CUTTING LOGS TO FORM LOG JOINTS

[75] Inventor: Ronald A. Wrightman, Bracebridge, Canada

[73] Assignee: True North Log Home Machinery Inc., Bracebridge, Canada

[21] Appl. No.: 381,327

[22] Filed: Jul. 18, 1989

[30] Foreign Application Priority Data

Aug. 17, 1988 [CA] Canada .................................... 575032

[51] Int. Cl.$^5$ ............................................... B27C 9/00
[52] U.S. Cl. ..................................... 144/3 A; 83/564; 144/3 R; 144/39; 144/198 R; 144/379
[58] Field of Search ................ 83/517, 564, 622, 432; 144/1 R, 3 R, 3 A, 85, 89, 133 R, 133 A, 198 R, 379

[56] References Cited

U.S. PATENT DOCUMENTS

| | | | |
|---|---|---|---|
| 3,251,388 | 5/1966 | Ennis | 144/3 R |
| 4,031,933 | 6/1977 | Piche | 144/198 R |
| 4,221,246 | 9/1980 | Grutter | 144/3 R |
| 4,243,082 | 1/1981 | Paris, Jr. et al. | 144/3 R |

Primary Examiner—W. Donald Bray
Attorney, Agent, or Firm—Fetherstonhaugh & Co.

[57] ABSTRACT

A machine for cutting logs to provide a dovetail log joint is provided with a number of saw legs which are slidably mounted on carriages, some of which are movable in order to adjust the angle of inclination of the saw blades. This machine permits dovetail tenons to be formed at either end of a log to provide both inside and outside corner joints. All of the necessary cuts can be effected while the log is held in a fixed position, it is only necessary to move the log longitudinally of itself in order to form the tenons at opposite ends. C-clamps are also provided for applying pressure to the log joint during assembly of the joint.

10 Claims, 11 Drawing Sheets

MACHINE FOR CUTTING LOGS TO FORM LOG JOINTS

This invention relates to log joint cutting machinery and equipment for use in forming log joints.

PRIOR ART

In my prior Pat. No. 4,392,520, a machine is disclosed which is used for the purposes of forming notches in the end of a log to form dove tail tenons. In this device, it is necessary to adjust the angular position of the log with respect to the cutting saws and it is necessary to introduce opposite ends of the log to the cutting station from the same side of the cutting station. While this mechanism is effective, it does not permit the straight through passage of the logs through the cutting station in a manner which is compatible with conventional production line procedures.

The log cutting machine of the present invention serves to permit all of the cutting operations which are required in order to form a tenon at one end of the log to be performed in a one-step operation after the log is positioned in the cutting station.

The present apparatus also permits opposite ends of a log to be cut sequentially by forming all of the required cuts in one end and then moving along longitudinally through the cutting station to a second position in which the other end of the log is cut to provide all of the necessary cuts.

Difficulty has also been experienced in attempting to draw the joints of a log wall into the required position to facilitate the location of the locking dowel pins. The clamps of the present invention serve to be overcome these difficulties.

Accordance to one aspect of the present invention, there is provided a machine for cutting logs to provide a predetermined log joint configuration at one end thereof comprising means for supporting a log in a logging station with its longitudinal extent extending in a first direction and one end face thereof extending in a datum plane which extends normal to the first direction, first saw mounting means for mounting first saw means for movement through the cutting station along a first cutting path which extends transversely of said first direction, second saw mounting means for mounting second saw means for movement through the cutting station along a second path which converges with and intersects at first cutting path on one side of the cutting station, pivot means pivotally supporting said first mounting means for movement between a first position in which it supports the first saw for movement in said first path and a second position in which the first support means is remote from said second path to provide clearance for the movement of the second saw as it travels along said first path in use.

According to a further aspect of the present invention, there is provided a machine for cutting logs to form a dovetail tenon at at least one end thereof, each log having a pair of oppositely disposed end faces, an upper face, a lower face and first and second side faces extending longitudinally between said end faces, comprising a main frame having a log cutting station located therein, log guide means extending into said cutting station along a loading path which extends in a first plane, stop means in said first path for arresting the movement of a log along said first path to locate one of said end faces of the log in a first datum plane, a first saw guide means mounted in said main frame and located above said log guide means, a first saw carriage sildably mounted on first saw guide means for movement therealong in a second direction which extends transversely of the first direction, a first saw mounted on said first carriage, said first saw having a first saw blade mounted for rotation thereon in a first sawing plane which extends parallel to said second direction, first drive means for driving said first saw carriage to and fro along said first saw guide means between a first position and a second position such that movement from the first position to the second position will cause the saaw blade to form a first cut in an end face of a log which is located at a sawing position with its face positioned in said first datum plane in use, a second saw carriage slidably mounted on said first saw guide means for movement therealong in said second direction, a second saw mounted on said second carriage, said second saw having a second saw blade mounted for rotation thereon in a second sawing plane which extends perpendicular to said first sawing plane, second drive means for driving said second saw carriage to and fro along said first saw guide means between a first position and a second position such that movement from the first position to the second position will cause the second saw blade to form a second cut in a side face of a log which is located in said sawing position, said second cut extending to the first cut to form one face of a tenon, a second saw guide means mounted in said main frame and located below said log guide means, a third saw carriage slidably mounted on said second saw guide means for movement therealong in a third direction which extends transversely of the first direction, a third saw mounted on said carriage, said third saw having a third saw blade mounted for rotation thereon in a third sawing plane which extends parallel to said third direction, a fourth saw mounted on said third carriage, said fourth saw having a fourth saw blade mounted for rotation thereon in a second sawing plane, third drive means for driving said third saw carriage to and fro along said second saw guide means between a first position and a second position such that movement from the first position to the second position will cause said third saw blade to form a third cut in an end face of a log and the fourth blade to form a fourth cut in the other side face of a log which is located a sawing position with its end face position in said first datum plane in use.

According to yet another aspect of the present invention, there is provided a C-clamp for applying pressure to a log joint comprising a C-shaped frame having first and second oppositely disposed legs connected by a bridge member, each of said legs having a proximal end at the bridge member and a distal end remote from the bridge member, a first of said legs being pivotally mounted on the bridge member at its proximal end for movement toward and away from the second leg, a clamping screw threadedly mounted at the distal end of the second leg, said threaded screw having one end thereof mounted at the distal end of the first leg such that by rotatably driving the threaded screw, the first leg may be caused to pivot as aforesaid to move toward and away from said second leg, first and second pins projecting laterally from the first and second anchoring pins mounted on the first and second legs and projecting laterally therefrom, said mounting pins being adapted to fit in a close-fitting relationship with said mounting passages formed in the logs of a log joint such that movement of the first arm toward the second arm in response to operation of the clamping screw will serve to draw the mounting pins towards one another.

The invention will be more clearly understood after reference to the following detailed specification read in conjunction with the drawings wherein;

FIG. 11 is a view similar to FIG. 9 showing the fourth cut.

Figure 1:
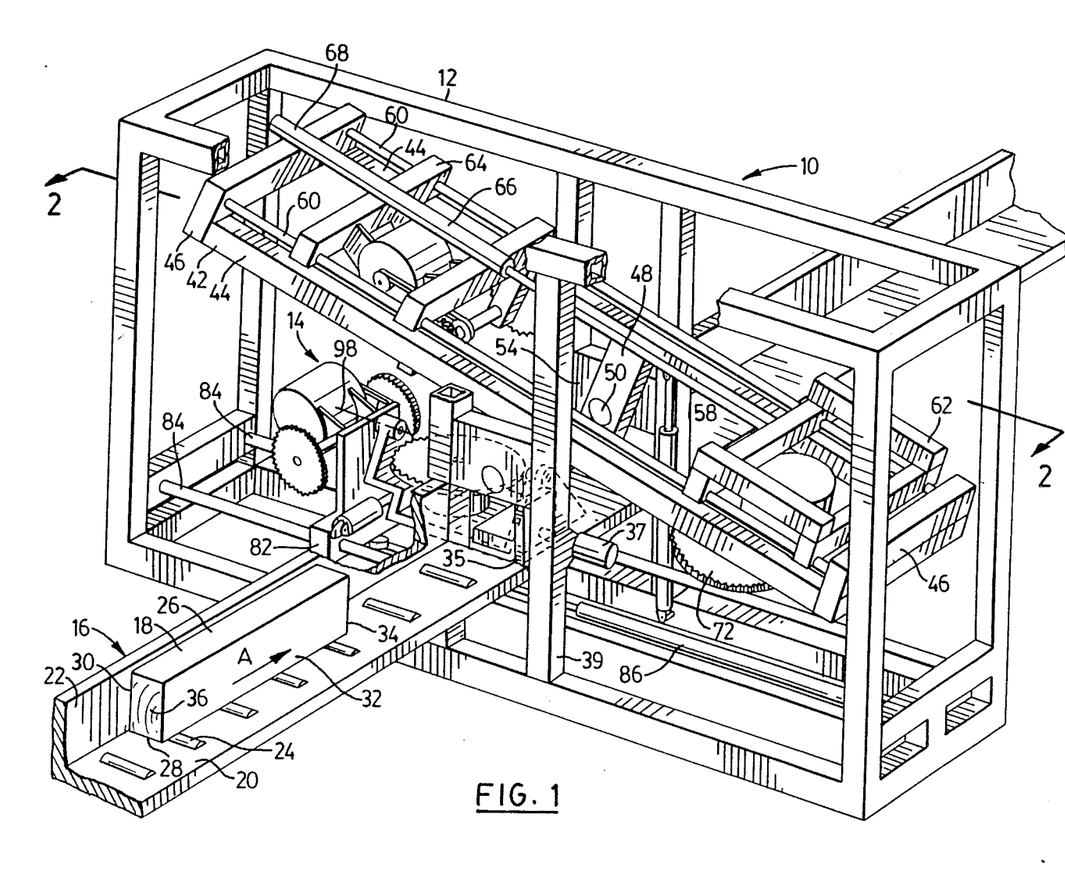
FIG. 1 is a pictorial view of a log cutting machine constructed in accordance with an embodiment of the present invention.

With reference to FIG. 1 of the drawings, the reference numeral 10 refers generally to a machine constructed in accordance with an embodiment of the present invention.

The machine 10 has a main frame 12 within which a log cutting station 14 is formed. The machine 12 also includes a log guide 16 which serves to guide and convey logs 18 into, through and away from the log cutting station 14 along a first path which extends in the direction of the arrow A. The guide 16 includes a bottom wall 20 and a back wall 22 which extend at right angles to one another. Rollers 24 are mounted in the bottom wall 20 to facilitate the movement of the log 18 along the guide 16.

The logs 18 will generally be in the form of longitudinally elongated logs having a substantially rectangular cross-sectional configuration. As shown in FIG. 1, the log 18 has an upper face 26, a lower face 28, a back face 30 and a front face 32. The log 18 also has a first end face 34 and a second end face 36.

Figure 2:
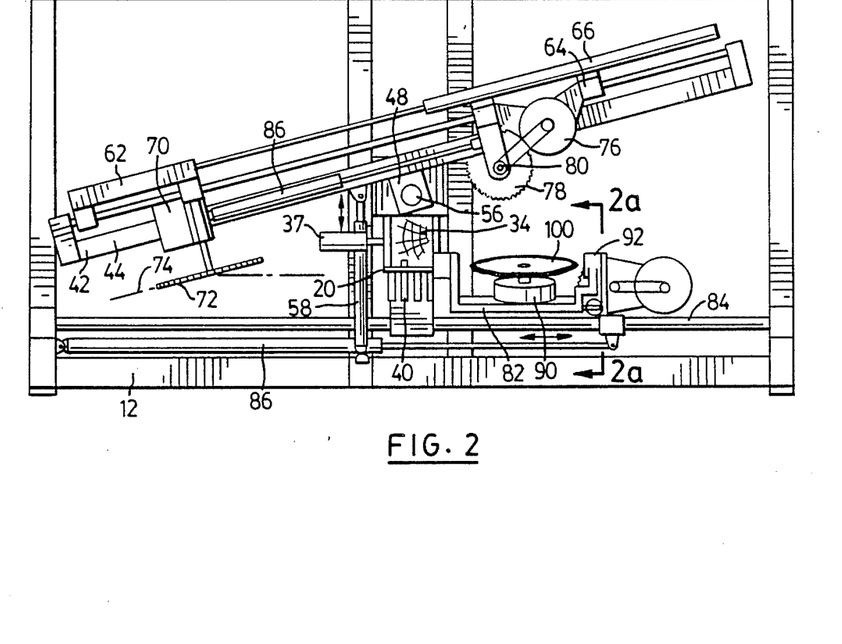
FIG. 2 is a sectional side view of the machine of FIG. 1 taken along the line 2—2 of FIG. 1.

A plurality of stop members 40 (FIG. 2) are mounted on the bottom wall 20 of the log cutting guide at spaced intervals along the length thereof. These stop members are supported by pneumatic rams so that any selected stop may be extended upwardly above the bottom wall to act as a stop which will extend into the path of travel of the log and will be encountered by the end face 34 or the end face 36 as will be described hereinafter. The stops 40 are located at different spaced intervals from the path of the various saws so as to accommodate logs of different sizes.

A first saw guide frame 42 is mounted in the main frame 12 and is located above the log guide 16. The first saw guide frame 42 has a pair of oppositely disposed beam members 44 which extend parallel to one another and are connected at opposite ends by end plates 46. A pair of arms 48 project downwardly from the centre of the beams 44. Pivot pins 50 pivotally connect the arms 48 to bearing support plates 54 which are mounted on the frame 12. The first saw guide frame 42 can pivot about the axis 56 of the pivot pin 50 for movement between the position shown in FIGS. 1 to 4 and the position shown in FIGS. 5 and 6.

Figure 4:
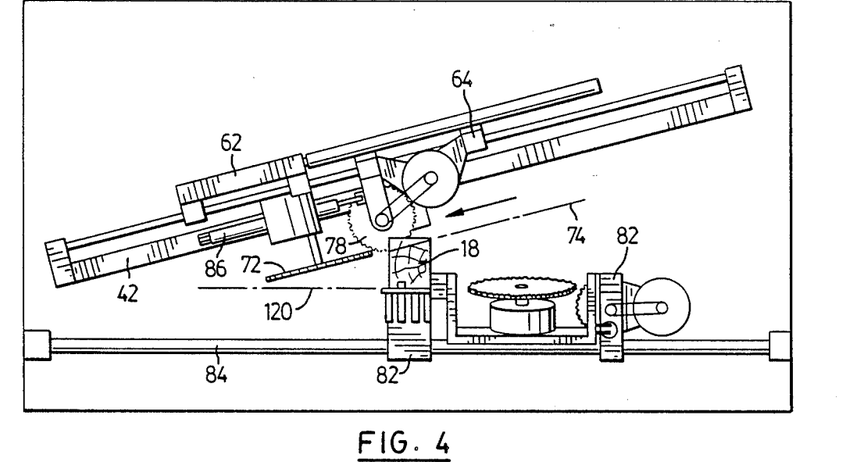
FIG. 4 is a view similar to FIG. 3 showing a second position of the first saw carriage.
Figure 5:
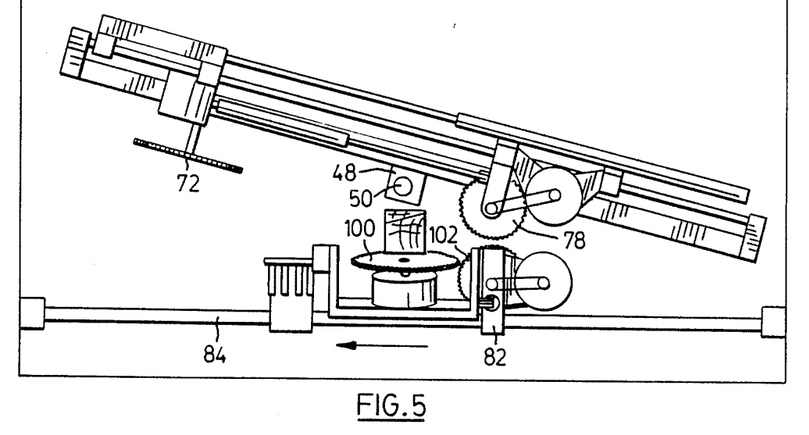
FIG. 5 is a view similar to FIG. 3 showing a second position of the second saw carriage.
Figure 6:
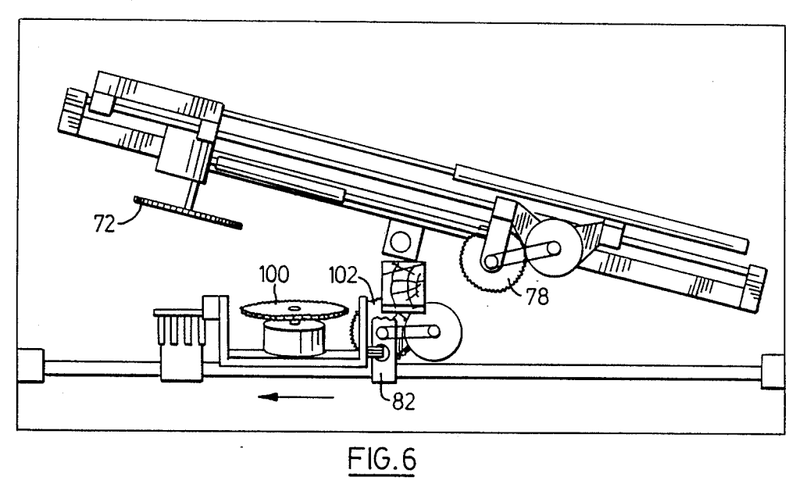
FIG. 6 is a view similar to FIG. 4 showing a second position of the third saw carriage.

A ram 58 has one end connected to the first saw guide frame 42 and its other end mounted so as to be fast with respect to the frame 12 such that when the ram 58 is extended, it will locate the first saw guide frame 42 in the first position shown in FIG. 1 and when it is contracted, it will locate the saw guide frame 42 in the position shown in FIG. 5. The first saw guide frame 12 has a pair of guide rails 60 which extend longitudinally between the end plates 46. A first saw carriage 62 and a second saw carriage 64 are sildably mounted on the guide rails 60. An extensible ram 66 has a cylinder portion 68 mounted on the second carriage 64 and a rod portion 70 which is connected to the first carriage 62. The ram 66 is in the extended position when the carriages 62 and 64 are spaced from one another as shown in FIG. 1 and is in the retracted position when the first and second carriages 62 and 64 are located in the positions shown in FIGS. 3 and 4.

A first saw 70 is mounted on the first saw carriage 62 and supports a circular saw blade 72 for rotation in a first sawing plane 74 which extends parallel to the guide rails 60. Movement of the first carriage 62 along the first saw guide will move the saw blade 70 along the first sawing plane 74.

A second saw which is generally identified by the reference numeral 76 has a pair of saw blades 78 mounted co-axially on a shaft 80 at longitudinally spaced intervals. One of the saw blades 78 is used when cutting a first end of a log and the other saw blade 78 is used when forming a cut at the other end of the log as will be described hereinafter. An extensible ram 86 has one end connected to the beam members 44 and its other end connected to the second carriage 64 such that when the ram is extended it will locate the second carriage 64 in the position shown in FIG. 3 and when it is connected, it will locate the second carriage 64 in the position shown in FIG. 4.

A third saw carriage 82 is slidably mounted on second guide rods 84. A third extensible ram 86 has one end connected to the frame 12 and its other end connected to the third saw carriage 82. The third extensible ram 86 serves to locate the third saw carriage 82 in the position shown in FIGS. 1 to 4 of the drawings when in the extended position and is operable to move the second carriage 82 to the position shown in FIG. 6 of the drawings as it contracts.

Figure 2A:
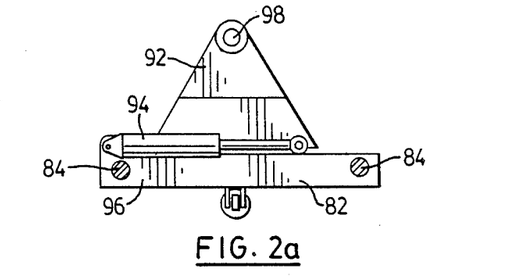
FIG. 2a is a sectional side view of the cradle which supports one of the saws taken along the line 2a—2a of FIG. 2.

A third saw 90 is mounted on a cradle 92 which is pivotally mounted on the third carriage 82. An extensible ram 94 (FIG. 2a) serves to connect the cradle 92 to the transverse member 96 of the carriage 82. The cradle 90 can pivot about the axis 98 in order to adjust the angular position of the saw blade 100. A pair of fourth saw blades 102 (FIG. 3) are mounted on opposite ends of a shaft 104 for rotation therewith. The shaft 104 is rotatably driven by the motor 106.

Figure 3:
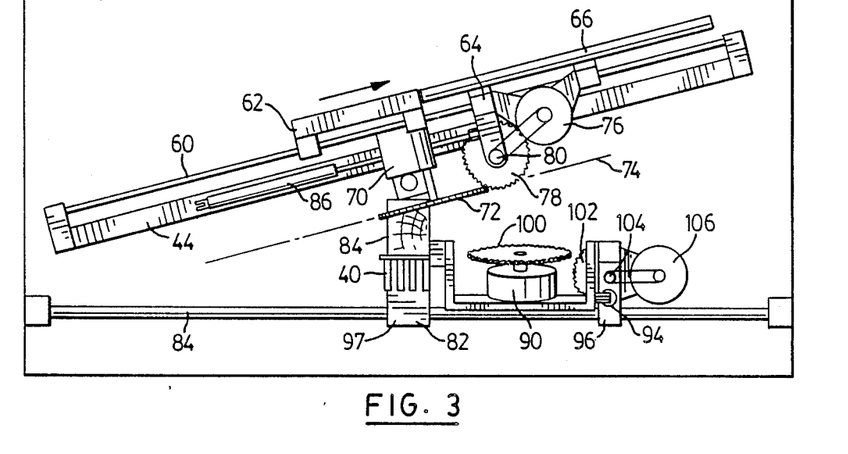
FIG. 3 is a side view similar to FIG. 2 showing a second position of the first saw.

As shown in FIG. 3 of the drawings, the stop members 40 are mounted on the transverse member 97 of the third carriage 82 so that they will be moved out of the path of the third saw blade as it is driven across the end face of the log in use.

In use, the machine of the present invention is capable of cutting the log 18 to provide any one of the tenons 110a, 110b, 110c or 110d(FIG. 11a, 11b, 11c and 11d). Each tenon has an upper face 112, a first shoulder face 114, a lower face 116 and a second shoulder face 118.

Figure 7:
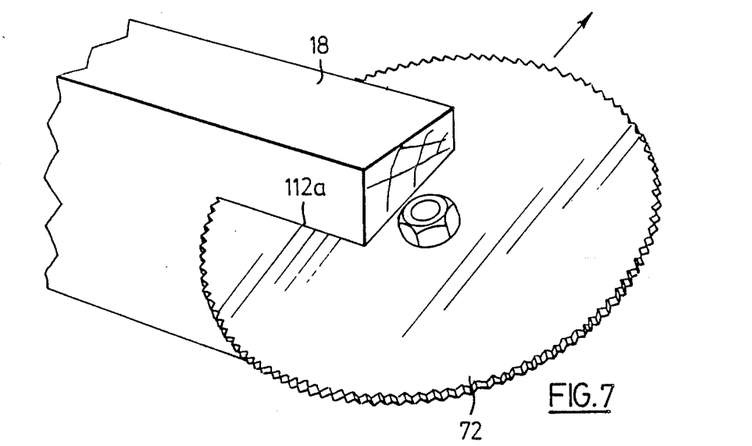
FIG. 7 is a view similar to FIG. 5 showing a further position of the third saw carriage.
Figure 8:
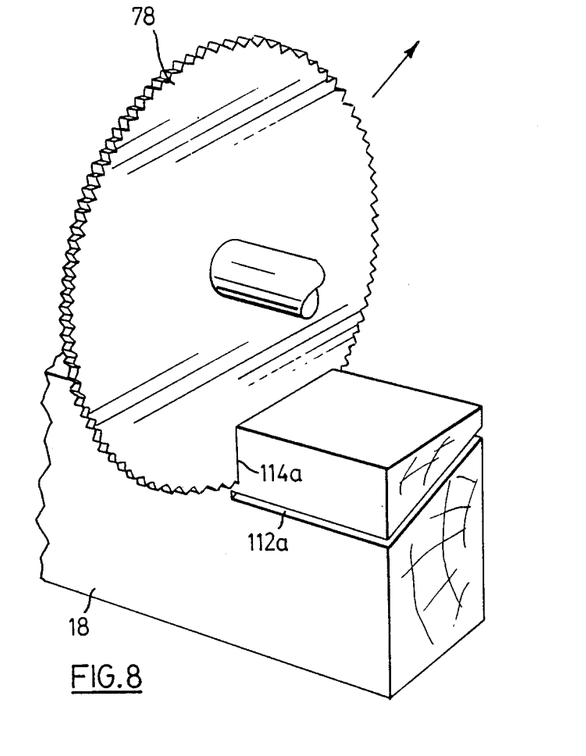
FIG. 8 is a pictorial view showing the first cut which is made in the end of a log.
Figures 11A, 11B, 11C, 11D:
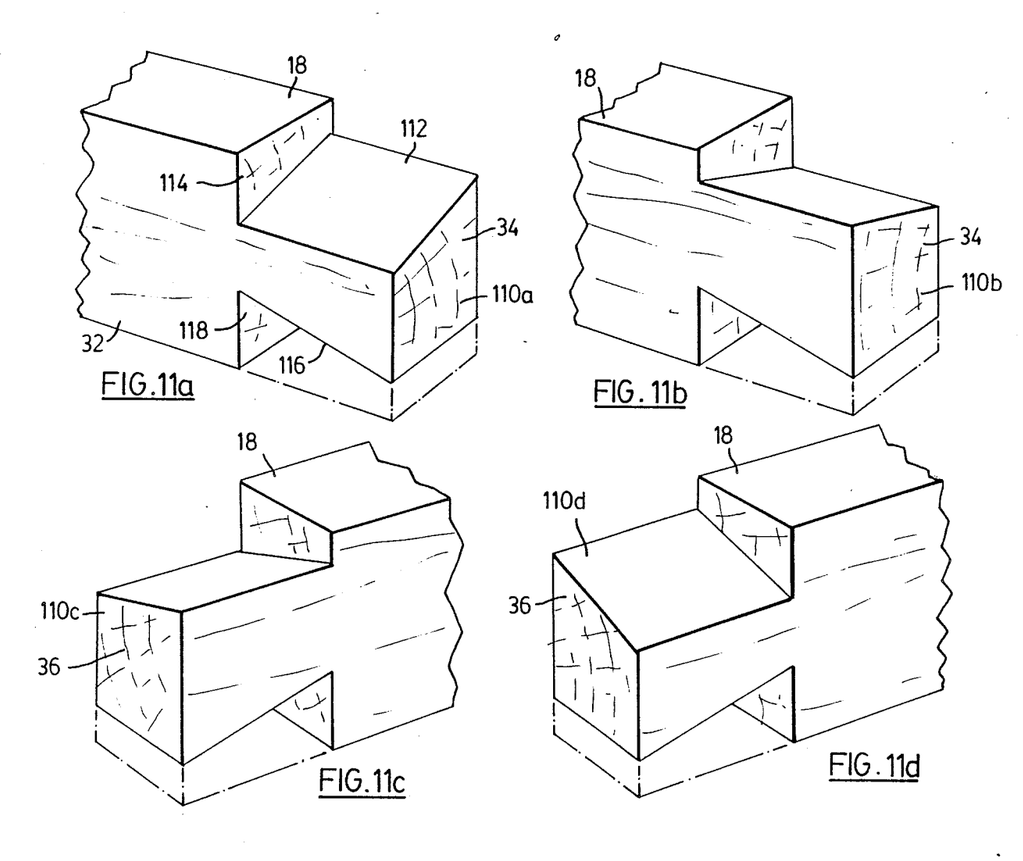
FIGS. 11a, 11b, 11c and 11d are pictorial end views of a log showing different tenon configurations which can be formed using the machine of the present invention.

In use, the operator of the machine will know the proportions of the log 18 which is to be cut and will activate the appropriate stop member 40 so that it is elevated to assume the position which will serve to locate the first end face 34 in the datum plane from which all the various saw cuts are measured. When a tenon such as that illustrated in FIg. 11a is required, the first saw guide frame 42 is angularly inclined as shown in FIGS. 1 through 4. The log 32 is clamped against the back wall 22 of the support by means of a clamping plate 35 (FIG. 1) which is mounted on the end of the shaft of an extensible ram 37 which is mounted on the post 39 of the frame 12. The ram 66 is then activated to move the first carriage from the position shown in FIG. 2 to the position shown in FIG. 3. This will have the effect of causing the saw blade 72 to form the first saw cut 112a as shown in FIG. 7 of the drawings. The ram 86 is then activated to move from its extended position shown in FIG. 3 to its contracted position shown in FIG. 4. As a result, the first carriage 62 and the second carriage 64 will be driven from the position shown in FIg. 3 to the position shown in FIG. 4 and the saw blade 78 will form the second cut 114a in the manner illustrated in FIG. 8 of the drawings.

Figure 9:
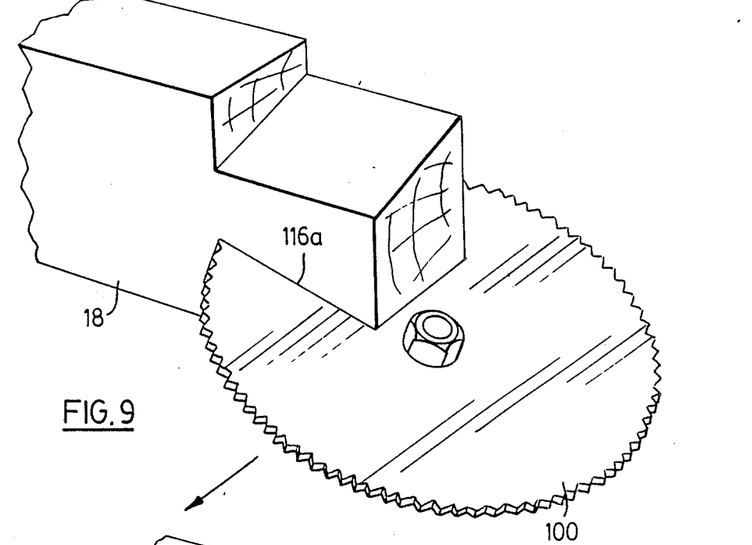
FIG. 9 is a pictorial view of an end of a log showing the second cut.

In order to form the third cut 116a illustrated in FIG. 9 of the drawings, the saw blade 100 must be angularly inclined with respect to the horizontal plane of the guide rails 84. This is achieved by activating the ram 94 (FIG. 2a) to move the cradle 92 to locate the saw blade 100 in angularly inclined position shown in FIg. 3. The ram 94 may also be activated to cause the cradle 92 tp pivot about axis 98 to extend in the plane required to form the third cut of tenon 110d or 110c of the opposite hand.

Figure 10:
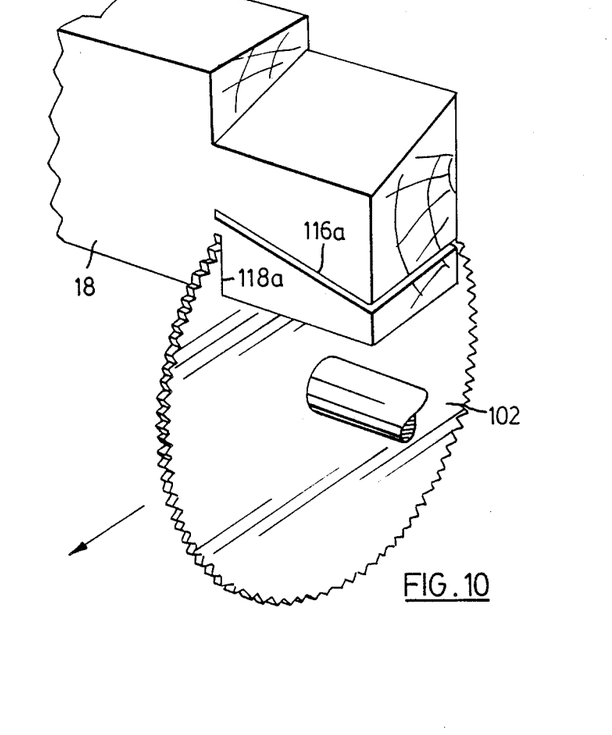
FIG. 10 is a view similar to FIG. 8 showing the third cut.

Because the path 120 of the cutter blade 100 intersects the path 74 of the cutter blade 72 as shown in FIG. 4 of the drawings, it is necessary to move the first saw guide frame 42 from the position shown in FIG. 4 to the position shown in FIG. 5 to provide a clear path for the movement of the third carriage 82. As the third carriage 82 is driven from the position shown in FIG. 4 to the position shown in FIG. 5 and then to the position shown in FIG. 6, the third saw blade 100 will form the third saw cut in the manner illustrated in FIG. 9 of the drawings and then the appropriate saw blade 102 will form the fourth cut 118a in the manner illustrated in FIg. 10 of the drawings. Upon completion of the fourth saw cut 118a, the carriage 82 will be returned to the position shown in FIGS. 1 and 2. In order to permit this return movement, the saw frame 42 will be returned to its position shown in FIGS. 1 to 4.

To cut a log to obtain profile illustrated in FIG. 11b, the ram 58 is extended to locate the first guide frame 42 in the position shown in FIG. 5 before the first cut is formed, thereafter, the cutting procedure is the same as that previously described.

To cut a log to obtain the profiles illustrated in FIGS. 11c and 11d of the drawings, it is merely necessary to relocate the cradle 92 in a position such that the third saw blade 100 is inclined in the opposite transverse direction to that illustrated in FIGS. 3 and 4 of the drawings by activating the ram 94 to cause the cradle 100 to pivot about the axis 98. The remainder of the saw cutting operation will remain the same as that previously described with the first guide frame being located in either the position shown in FIG. 2 to produce the tenon of FIG. 11c or the position shown in FIG. 5 to produce the tenon of FIG. 11d.

Figure 12:
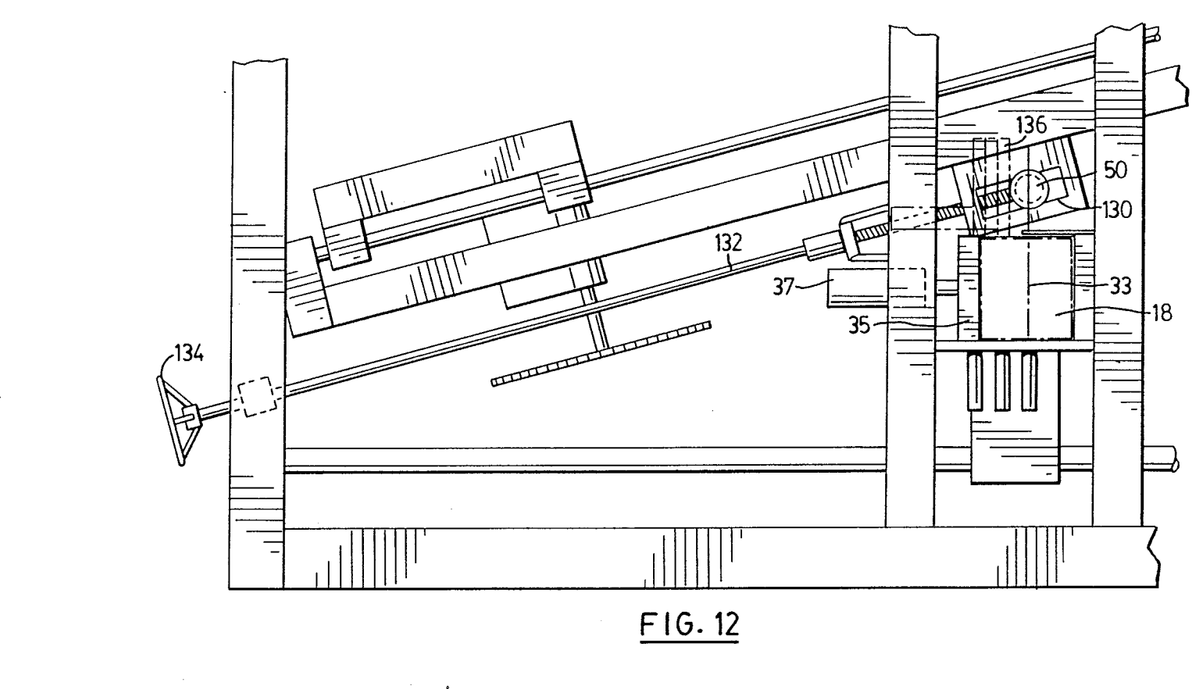
FIG. 12 is a side view of a portion of the machine of FIG. 1 illustrating the mechanism which is used for the purposes of adjusting the position of the pivot point of the first saw carriage.

Because the machine of the present invention is intended to be used when cutting logs of different widths, it is necessary to make provision for adjustment of the position of the pivot pin 50 so that it will remain aligned with the central plane 33 of logs 18 of different widths. This is achieved by mounting the pivot pins 60 in a slipway 130 and by providing a jacking screw 132 which has a hand wheel 134 which can be rotatably cranked in order to move the distal end of the screw longitudinally with respect to the slipway 130. In order to move the pivot pin 60, it is merely necessary to rotate the hand wheel 134. A plurality of spacer fingers 136 are mounted so as to provide a support for the pivot pin 50 which will limit the movement of the pivot 50 in the downward direction of the slipway 130. These arms 136 can be selectively inserted or removed in order to provide a positive stop for the pivot pin 50. Thus, when it is necessary to move the pivot pin 50 from the position shown in FIG. 12 to a position somewhat to the right of that shown in FIG. 12, it is merely necessary to remove one of thee spacer fingers 136 and wind the crank handle 134 in the direction which will permit the distal end of the shaft to move downwardly until the pivot pin 50 comes to rest on the next spacer finger 136.

Figure 13:
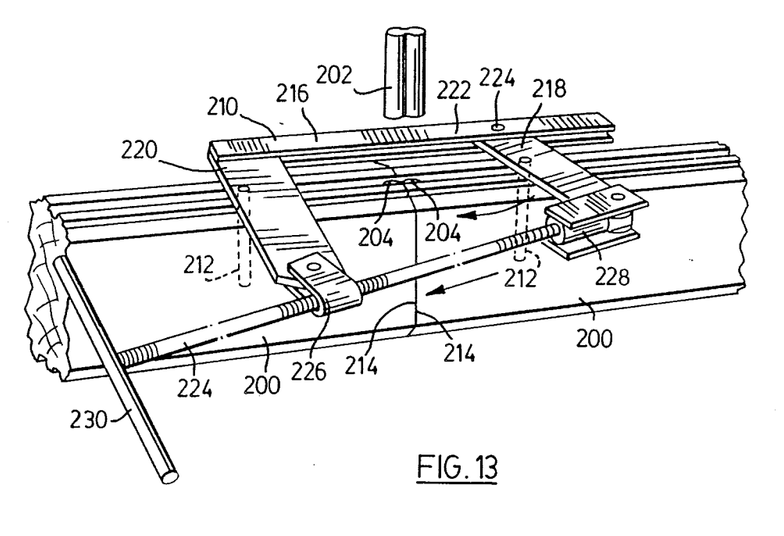
FIG. 13 is a pictorial view of a clamp constructed in accordance with an embodiment of the present invention.

A C-clamp which is suitable for use in attempting to draw the abutting ends of a pair of logs 200 toward one another to facilitate the location of the anchor pin 202 is illustrated in FIG. 13 of the drawings and is generally identified by the reference numeral 210. Each of the logs 200 is formed with passages 212 which are spaced a substantial distance from the butting end faces 214.

The C-clamp 210 has a C-shaped frame 216 which has first and second oppositely disposed legs 218 and 220, the proximal ends of which are connected to a bridge member 222. The first leg 218 is pivotally connected by means of a pivot pin 224 to the bridge member 216. A clamping screw 224 is threadedly mounted in a threaded sleeve 226 which is located at the distal end of the second arm 220 and is pivotally mounted thereon. The other end of the screw 226 is mounted for rotation in a support sleeve 228 which is in turn pivotally mounted at the distal end of the first arm 218. By rotating the handle 230, the threaded clamping screw srves to cause the arm 218 to pivot so that its distal end may be moved toward or away from the distal end of the second arm 220. Movement of the first arm 218 toward the second arm 220 serves to draw the mounting pins 212 toward one another and this serves to draw the abutting end faces 214 of the logs toward one another to facilitate the location of the pin 202 in the passages 204.

Figure 14:
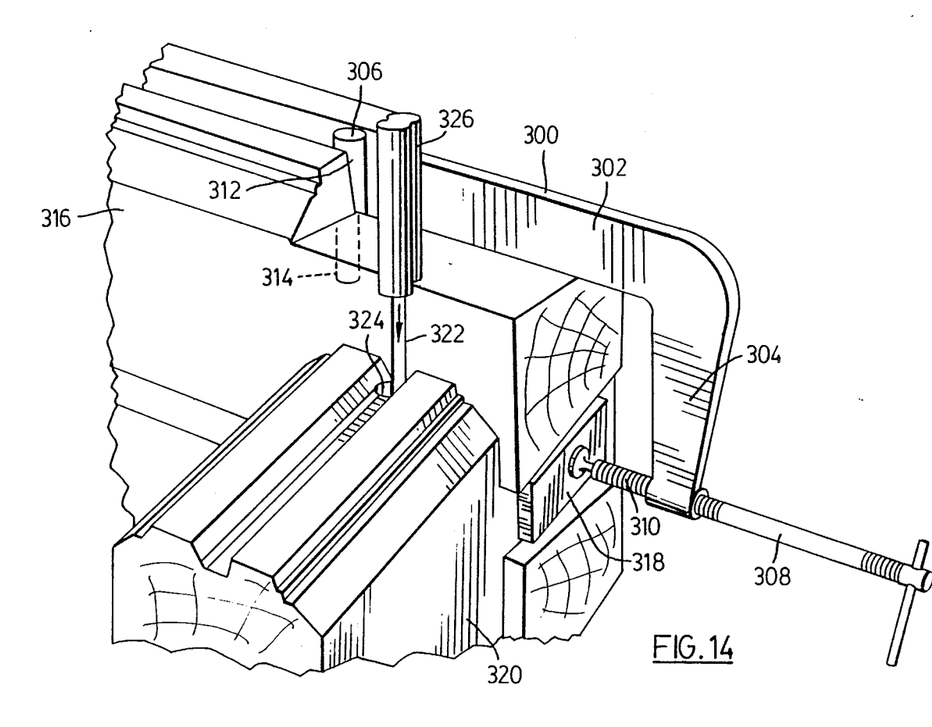
FIG. 14 is a pictorial view of a clamp constructed in accordance with a further embodiment of the present invention.

A further C-clamp 300 is illustrated in FIG. 14 of the drawings. The C-clamp 300 has a C-shaped frame 302 which has a first end 304 and a second end 306. A clamping screw 308 is threadedly mounted at the first end of the frame and has an inner end 310 which extends toward the second end of the frame. A mounting pin 312 is located at the second end of the frame and extends at right angles to the clamping screw 308. The mounting pin 312 proportioned to fit in a close-fitting relationship within the passage 314 of the log 316. A pressure pad 318 is located at the inner end of the clamping screw 308 and serves to bear against the side face of the tenon of the log 320 when the pin 312 is positioned in the passage 314. In use, the pin 312 is positioned in the passage 314 to anchor the second end of the clamp with respect to the log 316. Pressure is then applied by rotatably driving the threaded clamping screw 308 to apply pressure to the pad 318 which in turn applies pressure to the log 302. By adjusting the load applied in this manner, it is possible to algin the passages 322 and 324 of the logs 316 and 320 respectively, to facilitate the location of the connecting pin 326 therein.

Figure 15:
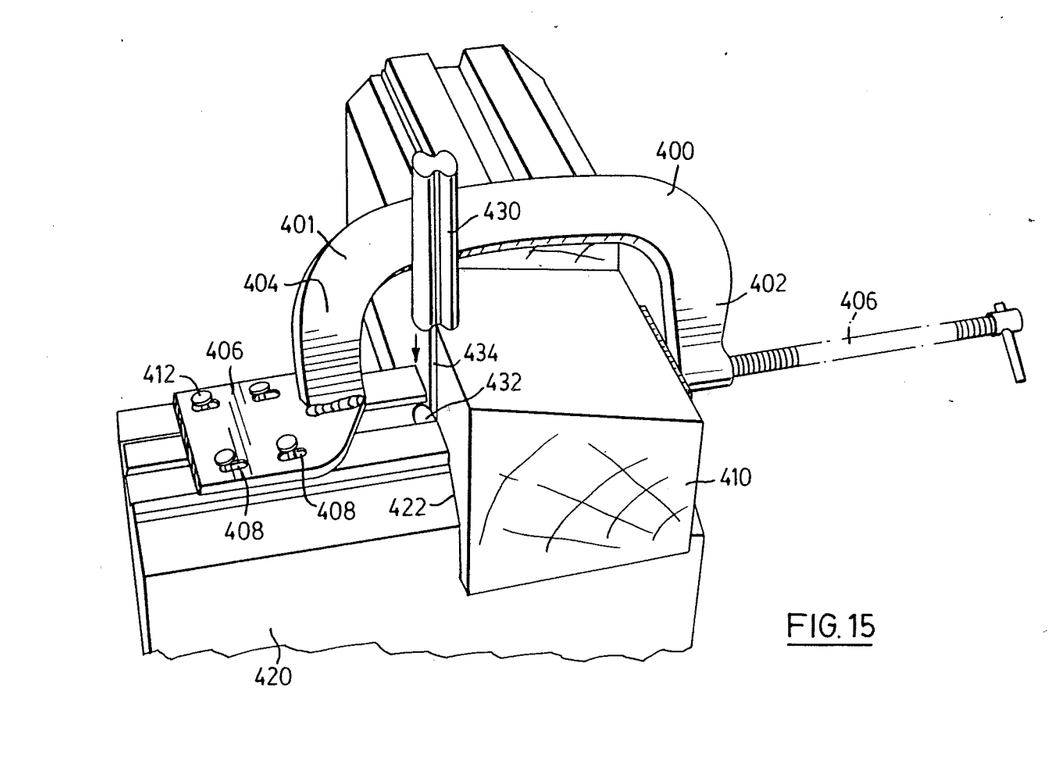
FIG. 15 is a pictorial view of a clamp constructed in accordance with yet another embodiment of the present invention.

A further C-clamp is illustrated in FIG. 15 of the drawings. This C-clamp includes a C-shaped frame 400 which has a first end 402 and a second end 404. A clamping screw 406 is threadedly mounted in the first end 402 and has an inner end portion which extends toward the second end and is arranged to bear against a log 410 in use. A mounting plate 406 is located at the second end 404 and extends parallel to the clamping screw 406. A plurality of mounting passages 408 open through the plate 406. In use, nails 412 are driven through the passages 408 to secure the plate 406 to the log 420. In use, when the C-clamp is positioned as shown in FIG. 15 of the drawings, the clamping screw 46 can be rotatably driven to drive the log 410 toward the log 420 to close the interface 422 to facilitate the entry of the locking pin 430 into the passages 432 and 434.

It will be noted that the transverse plane in which the mounting plate 46 extends is inclined at an angle of less than 90° with respect to the body portion 401 of the C-clamp so that the body portion 401 does not extend in the vertical plane in which the passages 432 and 434 extend.

I claim:

1. A machine for cutting logs to provide a predetermined log joint configuration at one end thereof comprising;
   (a) means for supporting a log in a logging station with its longitudinal extent extending in a first direction and one end face thereof extending in a datum plane which extends normal to the first direction,
   (b) first saw mounting means for mounting first saw means for movement through the cutting station along a first cutting path which extends transversely of said first direction,
   (c) second saw mounting means for mounting second saw means for movement through the cutting station along a second path which converges with and intersects at first cutting path on one side of the cutting station,
   (d) pivot means pivotally supporting said first mounting means for movement between first position in which it supports the first saw movement in said first path and a second position in which the first support means is remote from said second path to provide clearance for the movement of the second saw as it travels along said first path in use.

2. A machine as claimed in claim 1, wherein said cutting station has a width proportioned to accommodate a preselected log and a central axis extending through the centre of the width of the cutting station and wherein said pivot means has a pivotal axis located on said central axis.

3. A machine as claimed in claim 2, wherein said pivotal axis is located above the log cutting station.

4. A machine as claimed in claim 1, further comprising means for adjusting the position of the pivot means to maintain its position in alignment with the central axis of the cutting station as the log cutting station is adjusted to change its width.

5. A machine as claimed in claim 1, wherein said first saw means comprises;
   (a) a first saw having a first saw blade mounted for rotation in a first saw plane which extends parallel to said first direction,
   (b) a second saw means having at least one saw blade mounted for rotation in a second sawing plane which extends at an angle to the first sawing plane.

6. A machine as claimed in claim 5, wherein said first saw mounting means comprises first and second saw carriages supporting said first and second saws respectively for independent movement across said cutting station.

7. A machine as claimed in claim 6, wherein said second saw means comprises two saw blades arranged in a spaced parallel relationship, one on either side of said datum plane, said two saw blades serving to permit the machine to cut right and left hand log joint configurations.

8. A machine for cutting logs to form a dovetail tenon at at least one end thereof, each log having a pair of oppositely disposed end faces, an upper face, a lower face and first and second side faces extending longitudinally between said end faces, comprising;
   (a) a main face having a log cutting station located therein,
   (b) log guide means extending into said cutting station along a loading path which extends in a first plane,
   (c) stop means in said first path for arresting the movement of a log along said first path to locate one of said end faces of the log in a first datum plane,
   (d) a first saw guide means mounted in said main frame and located above said log guide means,
   (e) a first saw carriage slidably mounted on said first saw guide means for movement therealong in a second direction which extends transversely of the first direction,
   (f) a first saw mounted on said first carriage, said first saw having a first saw blade mounted for rotation thereon in a first sawing plane which extends parallel to said second direction,
   (g) first drive means for driving said first saw carriage to and fro along said first saw guide means between a first position and a second position such that movement from the first position to the second position will cause the saw blade to form a first cut in an end face of a log which is located at a sawing position with its end face position in said first datum plane in use, (h) a second saw carriage slidably mounted on said first saw guide means for movement therealong in said second direction, (i) a second saw mounted on said second carriage, said second saw having a second saw blade mounted for rotation thereon in a second sawing plane which extends perpendicular to said first sawing plane, (j) second drive means for driving said second saw carriage to and fro along said first saw guide means between a first position and a second position such that movement from the first position to the second position will cause the second saw blade to form a second cut in a second face of a log which is located in said sawing position, said second cut extending to the first cut to form one face of a tenon, (k) a second saw guide means mounted in said main frame and located below said log guide means, (l) a third saw carriage slidably mounted on said second saw guide means for movement therealong in a third direction which extends transversely of the first direction, (m) a third saw mounted on said carriage, said third saw having a third saw blade mounted for rotation thereon in a third sawing plane which extends parallel to said third direction, (n) a fourth saw mounted on said third carriage, said fourth saw having a fourth saw blade mounted for rotation thereon in a second sawing plane, (o) third drive means for driving said third saw carriage to and fro along said second saw guide means between a first position and a second position such that movement from the first position to the second position will cause said third saw blade to form a third cut in an end face of a log and the fourth blade to form a fourth cut in the other side face of a log which is located a sawing position with its end face positioned in said first datum plane in use.

9. A machine as claimed in claim 8, wherein said stop means comprises a plurality to stop members located at longitudinally-spaced intervals along said log cutting station, said stop members being selectively operable to stop the forward progress of the log at different points along the cutting station so as to provide a number of datum planes in which the end of the log may be arrested so as to adjust the distance between the datum plane and the path of the first and second saw blades.

10. A machine as claimed in claim 8, wherein two second saws are mounted on said second carriage, said second saws each having second saw blades, said second saw blades being spaced from one another, one on either side of said datum plane for use in cutting opposite ends of a log.

* * * * *